Figure 1:
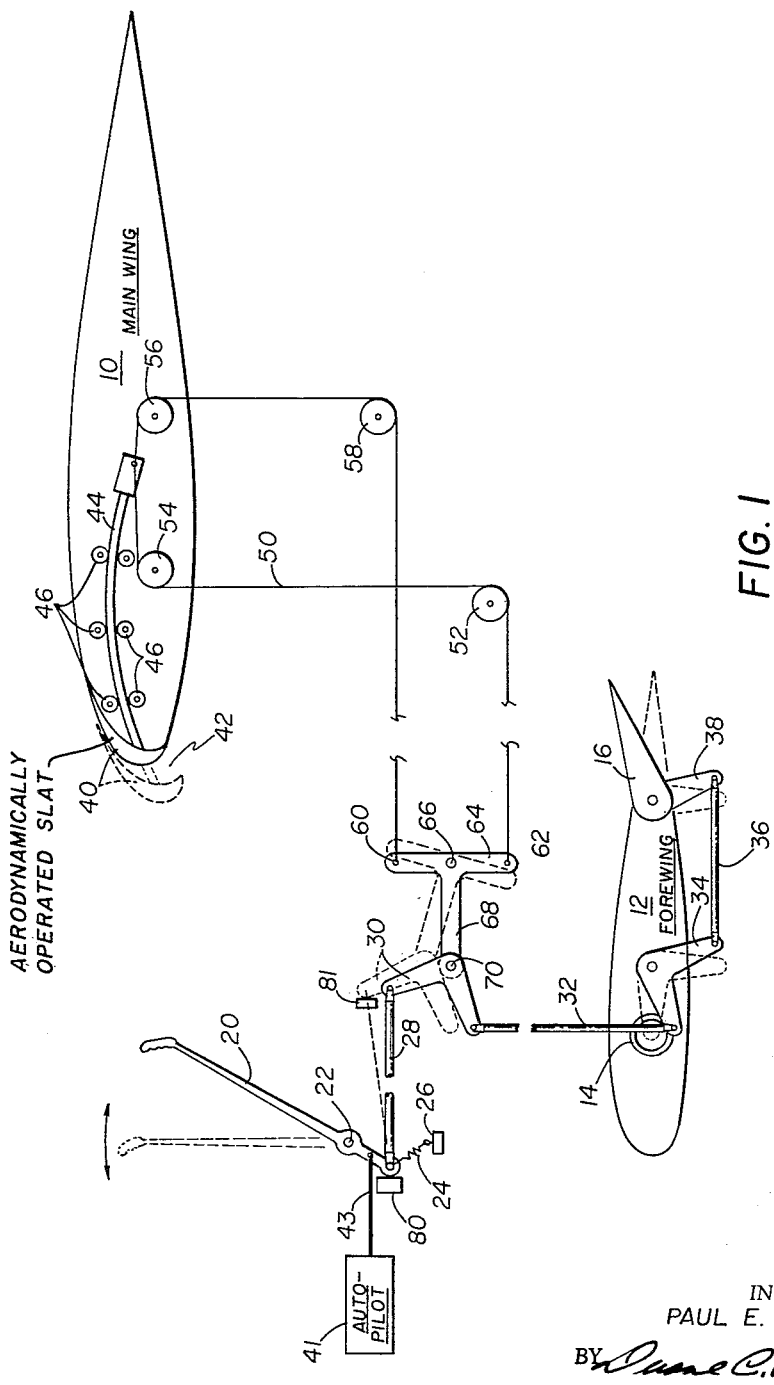

INVENTOR.
PAUL E. HOVGARD
ATTORNEY

United States Patent Office 3,134,562
Patented May 26, 1964

3,134,562
STALL PREVENTION SYSTEM
Paul E. Hovgard, Wichita, Kans., assignor to The Boeing Company, Wichita, Kans., a corporation of Delaware
Filed Jan. 18, 1962, Ser. No. 167,120
11 Claims. (Cl. 244—76)

My invention concerns means to prevent stalling of the main wing of an aircraft including approaching-stall sensing means on the wing, control means operable to reduce aircraft angle of attack, and connecting means between the sensing means and the control means operating to reduce angle of attack responsive to sensing of approaching stall. More specifically, the system is adapted for use on a canard aircraft having a smaller forewing ahead of a rear main wing. The stall sensing means is a slat on the main wing automatically aerodynamically operated to open a slot upon approaching stall of the main wing. The slat mechanism is connected to forewing control surface means and to the pilot-operable control system for the control surface, whereby the control surface is deflected to reduce aircraft angles of attack responsive to the slat opening upon approaching stall.

Stalling of the main wing is a particular problem with a canard aircraft. The upflow around the rear of the fuselage or the aerodynamic interference of the forewing vortex with the main wing can cause early stall of the main wing when aircraft angles of attack exceed certain levels. Once stall occurs, it is difficult to correct the airplane attitude in time with longitudinal control surface means on the forewing as the tail drops when the wing loses lift and causes a still greater lift loss; the airplane eventually goes into a tail slide from which recovery, if possible at all, involves great loss of altitude. In a conventional aircraft, the nose drops if the wing stalls, thereby permitting relatively early recovery.

The objectives of my invention include: to provide an improved means to correct dangerous stalling conditions of the main wing of a canard aircraft; to sense approaching stall by an automatically aerodynamically operated slat on the main wing that also acts to reduce stalling tendency of the wing; to connect such slat to the forewing elevator control means and to the pilot-operable control system for the elevator means so as automatically to reduce aircraft angles of attack upon sensed approaching stall; to provide in such a system a limit on movements of the control system to increase angles of attack when stall is sensed; to provide an aircraft system to prevent stalling of the main wing including approaching stall sensing means at the location of the main wing, control means at a location remote from the main wing operable to reduce aircraft angles of attack, and connecting means between the sensing means and the control means whereby angles of attack are automatically reduced responsive to sensing of approaching stall; and to devise a system meeting the above objectives which has high reliability, is easily maintainable, and is economical in manufacture and weight.

The invention and its objectives and advantages will be further described by the following material and by the drawing, in which:

FIGURE 1 is a diagrammatical view of a specific embodiment of the stall prevention system in which the system details are shown rather symbolically.

The drawing represents relationships found in a canard aircraft in which there is a large main wing 10 and a smaller forewing 12. The forewing is substituted for a tail horizontal stabilizer and elevator. It will be understood that FIGURE 1 is diagrammatical and that the comparative size and relative positions of the main wing 10 and forewing 12 may be substantially different from that shown in the drawing.

The forewing 12 could be fixed in position and have an aircraft longitudinal control surface means somewhat like the elevator in a conventional aircraft, but the forewing system shown is of the type in which the forewing 12 floats (is pivotal between certain limits) and is operable to act as longitudinal control means. The forewing 12 is pivotally mounted to the fuselage by bearing and journal means symbolically indicated in FIGURE 1 by journal 14.

In the drawing the control system to a tab 16 is shown diagrammatically and is not entirely within the wing envelope, and no details are shown of the routing of the control system from the fuselage to the forewing 12. Such details are common and fully disclosed in the prior art and do not need to be repeated here. Likewise the cable system to the main wing 10 is not necessarily to scale and does not show system details of the routing of the cables from the wing 10 through the fuselage, not shown.

According to the floating forewing canard aircraft system, tab 16 is deflected to produce elevator or longitudinal control effects of the forewing 12 increasing and decreasing aircraft angles of attack. The control system to the tab includes, serially: control stick 20 pivoted about pivot 22 normally biased to a neutral position by spring 24 secured to fixed aircraft structure 26; rigid link 28, bell crank 30, rigid link 32, bell crank 34 rigid link 36, and arm 38 on tab 16. Alternate input of movement to the control system is symbolically illustrated in FIGURE 1 by autopilot 41 and connecting link 43 to stick 20.

The main wing 10 has an automatically aerodynamically operated slat 40 providing a slot 42 when open thereby reducing the tendency of the upper surface of main wing 10 to stall at high angles of attack. Such a slat is located at the spanwise position on the wing at which stall from any cause would occur first. Automatic slats of similar nature are old in the art as shown by Patents 1,976,482, 2,938,680 and 2,973,925, so few details are given of the slat. In most of the prior automatic slat systems, means could be connected to the slat to produce a cable movement at a remote location upon opening of the slat. In the mechanism shown the slat is supported on arms 44 guided and supported on bearings 46, a cable 50 is provided running over pulleys 52, 54, 56, 58 and attached at its ends 60, 62 to a T-shaped crank 64 having a fixed pivot at 66 and having one leg 68 pivotally connected at 70 to bell crank 30.

When slat 40 opens, cable 50 is moved resulting in pivoting of T-crank 64. T-arm 68 forms a pivotal mounting for crank 30 so that the control system to tab 16 is affected by pivoting of the T-crank. In the showing of the drawing, bell crank 30 is moved to an upper position and, through the linkages, the movement of crank 30 produces a deflection of tab 16, as from the full line position in FIGURE 1 to the dotted line position. The system of the present invention thus operates to reduce stalling both by providing a slot 42 and by producing movement of the forewing tab 16 to reduce aircraft angles of attack, thus preventing the angle of attack of the airplane from increasing to the point at which the main wing would stall.

Preferably the tab 16 is aerodynamically balanced so as to require a minimum force for deflection. If control stick 20 were not held, and stick 20 being restrained in neutral position by the force of spring 24 and tab 16 being balanced, tab 16 would be moved by the pivoting of T-crank 64 rather than the control stick being deflected if movement in the control system were produced responsive to opening of slat 40. Stall conditions, resulting in opening of slat 40, would seldom occur with the stick neutral and unheld. Usually stall will occur only with stick 20 held back manually or with a similar movement in the control system produced by autopilot 41. If the stick is held, the input of motion to the control system by slat 40 must result in tab movement.

An abutment or stop to the movement of control stick 20 is shown at 80. This may be one of the stops normally provided to limit control stick movements. Such abutment can be provided elsewhere in the system, such as a limit on the pivoting of crank 30 at 81, disposed to be effective only in the deflected position of leg 68 supporting crank 30. The function of abutment 80 is to limit the amount tab 16 can be upwardly deflected by the control stick or autopilot. Note, however, that the abutment sets a different tab deflection limit when slat 40 is open than when slab 40 is closed. Presume that abutment 80 normally stops control stick 20 when tab 16 is upwardly deflected 20°. Further presume that the effect on the control system of opening slat 40 is an input of motion moving tab 16 downwardly 20°. This would mean that the pilot or autopilot could not move tab 16 upwardly past neutral position when slat 40 was fully open. If slat 40 is only partly open, a different limit is placed on upward deflection of tab 16. If the maximum input of motion from slat 40 were 15° in the above example, then the pilot could only deflect the tab upwardly 5°. The system thus can act in maximum or near maximum control stick positions to prevent the pilot from nullifying the input of motion from slat 40 by pulling control stick 20 further back.

As slat 40 is aerodynamically operated, it automatically adjusts to the needed input to the control system (to reduce the upward deflection of tab 16) according to the degree of approaching stall: slat 40 opens slightly for a low degree of approaching stall, opens moderately for a medium degree, and travels to its limits as the conditions near critical stalling conditions. The flow of air over the slat during flight results in an upwardly directed resultant force component. When the resultant force component passes behind the slot hypothetical rotational axis (curved arm 44 simulates mounting about a rotational axis or a series of rotational axes), the force will react on slat 40 to move it forwardly. As the slat moves, there will be a relocation or redirection of the resultant force component acting on slat 40 so that extension will stop when the direction of the resultant force component passes through the hypothetical rotational axis for that section of curved arms 44. The slat will be moved rearwardly when the resultant force component passes forward of the hypothetical axis.

The aerodynamic forces are a function of several factors including the wind configuration, slat configuration, shape and relative disposition of arms 44, air speed, and angle of attack. The stick position at which the main wing will stall will be influenced by the location of the center of gravity of the aircraft which in turn is influenced by factors such as the aircraft load of cargo, fuel, etc., and by redistribution of weight during flight due to consumption of fuel from tanks and the like. The present system should be designed for the least favorable condition, with the center of gravity in the position farthest aft, although this will mean that the system will act to reduce angle of attack a little soon when the center of gravity is farther forward. Although the system could be given further sophistication for adjustment responsive to the center of gravity position, the gains probably would not justify complicating the system. The pilot normally will sense operating of the slat but if he does not and moves the control stick in a direction to nullify the input to the control system by the slat, the slat will further open as the tendency to stall increases thereby increasing the input to the control system to move the tab back toward center or even beyond.

The operation of the system has been explained in the foregoing description of the structure: slat 40 automatically operates when stall occurs on the upper surface of main wing 10 and slot 42 is opened to decrease stall. Cable 50 moves producing a movement in the control system to move tab 16 in a direction to reduce angles of attack thereby reducing the tendency of the main wing to stall. The system is a straightforward mechanical assembly that has high reliability, easy maintainability, and minimum cost and weight.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. In a canard aircraft, floating forewing means, said forewing means having movable tab means operable to affect aircraft angles of attack, larger rear main wing means having movable slat means connected thereto, said slat means being adapted to be moved in a predetermined path for forming a stall preventing slot in said larger rear main wing means, operable control means connected to said movable tab means for controlling the position thereof relative to said floating forewing means and for controlling said aircraft angles of attack, and connecting means connected to said movable slat means and connected to said operable control means for controlling the position of said tab means responsive to movement of said slat means along said predetermined path.

2. In a canard aircraft, floating forewing means, said forewing means having movable tab means operable to affect aircraft angles of attack, larger rear main wing means having movable slat means connected thereto, said slat means being adapted to be moved forwardly in a predetermined path for forming a stall preventing slot in said larger rear main wing means, a pilot operable control stick pivotally connected to the aircraft, a T-shaped crank having a leg and a crossbar, said T-shaped crank being pivotally connected to the aircraft, a first bell crank having two legs, said first bell crank being pivotally connected to said leg of said T-shaped crank, a first rigid link having one end pivotally connected to said pilot operable control stick and another end thereof pivotally connected to one of said legs of said first bell crank, a second bell crank having two legs, said second bell crank being pivotally connected to said floating forewing means, a second rigid link having one end pivotally connected to the other one of said legs of said first bell crank and having another end pivotally connected to one of said legs of said second bell crank, a tab control arm rigidly connected to said tab means, a third rigid link having one end pivotally connected to the other of said legs of said second bell crank and having another end pivotally connected to an outer end of said tab arm, pivotal movement of said pilot operable control stick resulting in corresponding movement of said tab means via said first rigid link, said first bell crank, said second rigid link, said second bell crank, said third rigid link and said tab control arm for controlling the position of said tab means relative to said floating forewing means and for controlling aircraft angles of attack, a cable having an intermediate portion connected to said slat means in such a manner as to be responsive to movement of said slat means along said predetermined path, said cable having one end connected to one end of said crossbar of said T-shaped crank and having another end connected to the other end of said crossbar of said T-shaped crank, cable pulley means supporting and guiding the movement of said cable (axial movement of said cable by said slat means controlling the position of said tab means relative to said floating forewing means and controlling said angles of attack via said T-shaped crank, said first bell crank, said second rigid link, said second bell crank, said third rigid link, and said tab control arm, first stop means limiting the angular displacement of said pilot operable control stick in a positive angle of attack direction, a spring having one end connected to the aircraft and another end connected to said pilot operable control stick for returning the same to a neutral position, and second stop means for limiting the maximum displacement of said one of said legs of said first bell crank caused by movement of said pilot operable control stick in a positive angle of attack direction, and by movement of said slat means via said cable and said T-shaped crank, and autopilot means connected to said pilot operated control stick for controlling the pitch and said angles of attack of the aircraft by controlling the position of said tab means relative to said floating forewing means.

3. In a canard aircraft, floating forewing means, said forewing means having movable tab means operable to affect aircraft angles of attack, larger rear main wing means having movable slat means connected thereto, said slat means being adapted to be moved forwardly in a predetermined path for forming a stall preventing slot in said larger rear main wing means, a pilot operable control stick pivotally connected to the aircraft, a T-shaped crank having a leg and a crossbar, said T-shaped crank being pivotally connected to the aircraft, a first bell crank having two legs, said first bell crank being pivotally connected to said leg of said T-shaped crank, a first rigid link having one end pivotally connected to said pilot operable control stick and another end thereof pivotally connected to one of said legs of said first bell crank, a second bell crank having two legs, said second bell crank being pivotally connected to said floating forewing means, a second rigid link having one end pivotally connected to the other one of said legs of said first bell crank and having another end pivotally connected to one of said legs of said second bell crank, a tab control arm rigidly connected to said tab means, a third rigid link having one end pivotally connected to the other of said legs of said second bell crank and having another end pivotally connected to an outer end of said tab arm, pivotal movement of said pilot operable control stick resulting in corresponding movement of said tab means via said first rigid link, said first bell crank, said second rigid link, said second bell crank, said third rigid link and said tab control arm for controlling the position of said tab means relative to said floating forewing means and for controlling aircraft angles of attack, a cable having an intermediate portion connected to said slat means in such a manner as to be responsive to movement of said slat means along said predetermined path, said cable having one end connected to one end of said crossbar of said T-shaped crank and having another end connected to the other end of said crossbar of said T-shaped crank, and cable pulley means supporting and guiding the movement of said cable, and axial movement of said cable by said slat means controlling the position of said tab means relative to said flowing forewing means and controlling said angles of attack via said T-shaped crank, said first bell crank, said second rigid link, said second bell crank, said third rigid link, and said tab control arm.

4. In a canard aircraft, floating forewing means, said forewing means having movable tab means operable to affect aircraft angles of attack, larger rear main wing means having movable slat means connected thereto, said slat means being adapted to be moved forwardly in a predetermined path for forming a stall preventing slot in said larger rear main wing means, a T-shaped crank having a leg and a crossbar, said T-shaped crank being pivotally connected to the aircraft, a first crank, said first crank being pivotally connected to said leg of said T-shaped crank, a second crank having two legs, said second crank being pivotally connected to said floating forewing means, a first rigid link having one end pivotally connected to said first crank and having another end pivotally connected to one of said legs of said second crank, a tab control arm rigidly connected to said tab means, a second rigid link having one end pivotally connected to the other of said legs of said second crank and having another end pivotally connected to an outer end of said tab arm, a cable having an intermediate portion connected to said slat means in such a manner as to be responsive to movement of said slat means along said predetermined path, said cable having one end connected to one end of said crossbar of said T-shaped crank and having another end connected to the other end of said crossbar of said T-shaped crank, and cable pulley means supporting and guiding the movement of said cable, and axial movement of said cable by said slat means controlling the position of said tab means relative to said floating forewing means and controlling said angles of attack via said T-shaped crank, said first crank, said first rigid link, said second crank, said second rigid link, and said tab control arm.

5. In a canard aircraft, floating forewing means, said forewing means having movable tab means operable to affect aircraft angles of attack, a pilot operable control stick pivotally connected to the aircraft, a lever pivotally connected to the aircraft, a first crank having two legs, said first crank being pivotally connected to said lever, a first rigid link having one end pivotally connected to said pilot operable control stick and another end thereof pivotally connected to one of said legs of said first crank, a second crank having two legs, said second crank being pivotally connected to said floating forewing means, a second rigid link having one end pivotally connected to the other one of said legs of said first crank and having another end pivotally connected to one of said legs of said second crank, a tab control arm rigidly connected to said tab means, a third rigid link having one end pivotally connected to the other of said legs of said second crank and having another end pivotally connected to an outer end of said tab arm, pivotal movement of said pilot operable control stick resulting in corresponding movement of said tab means via said first rigid link, said first crank, said second rigid link, said second crank, said third rigid link and said tab control arm for controlling the position of said tab means relative to said floating forewing means and for controlling aircraft angles of attack, stop means limiting the angular displacement of said pilot operable control stick in a positive angle of attack direction, and means connected to the aircraft and connected to said pilot operable control stick for returning the same to a neutral position.

6. In an aircraft, first wing means having movable tab means operable to affect aircraft angles of attack, second wing means having movable slat means connected thereto, said slat means being adapted to be moved forwardly in a predetermined path for forming a stall preventing slot in said second wing means, a pilot operable control stick pivotally connected to the aircraft, a T-shaped crank having a leg and a crossbar, said T-shaped crank being pivotally connected to the aircraft, a first crank having two legs, said first crank being pivotally connected to said leg of said T-shaped crank, a first rigid link having one end pivotally connected to said pilot operable control stick and another end thereof pivotally connected to one of said legs of said first crank, a second crank having two legs, said second crank being pivotally connected to said first wing means, a second rigid link having one end pivotally connected to the other one of said legs of said first crank and having another end pivotally connected to one of said legs of said second crank, a tab control arm rigidly connected to said tab means, a third rigid link having one end pivotally connected to the other of said legs of said second crank and having another end pivotally connected to an outer end of said tab arm, pivotal movement of said pilot operable control stick resulting in corresponding movement of said tab means via said first rigid link, said first crank, said second rigid link, said second crank, said third rigid link and said tab control arm for controlling the position of said tab means relative to said first wing means and for controlling aircraft angles of attack, cable means having an intermediate portion connected to said slat means in such a manner as to be responsive to movement of said slat means along said predetermined path, said cable means having one end connected to one end of said crossbar of said T-shaped crank and having another end connected to the other end of said crossbar of said T-shaped crank, and cable pulley means supporting and guiding the movement of said cable means, and axial movement of said cable means by said slat means controlling the position of said tab means relative to said first wing means and controlling said angles of attack via said T-shaped crank, said first crank, said second rigid link, said second crank, said third rigid link, and said tab control arm.

7. In an aircraft as set forth in claim 6, stop means for limiting the maximum displacement of said one of said legs of said first crank and of said pilot operable control stick.

8. In an aircraft, first wing means having movable tab means operable to affect aircraft angles of attack, second wing means having movable slat means connected thereto, said slat means being adapted to be moved forwardly in a predetermined path for forming a stall preventing slot in said second wing means, a T-shaped crank having a leg and a crossbar, said T-shaped crank being pivotally connected to the aircraft, a first crank, said first crank being pivotally connected to said leg of said T-shaped crank, a second crank having two legs, said second crank being pivotally connected to said first wing means, a first rigid link having one end pivotally connected to said first crank and having another end pivotally connected to one of said legs of said second crank, a tab control arm rigidly connected to said tab means, a second rigid link having one end pivotally connected to the other of said legs of said second crank and having another end pivotally connected to an outer end of said tab arm, cable means having an intermediate portion connected to said slat means in such a manner as to be responsive to movement of said slat means along said predetermined path, said cable means having one end connected to one end of said crossbar of said T-shaped crank and having another end connected to the other end of said cross-bar of said T-shaped crank, and cable pulley means supporting and guiding the movement of said cable means, and axial movement of said cable means by said slat means controlling the position of said tab means relative to said first wing means and controlling said angles of attack via said T-shaped crank, said first crank, said first rgid link, said second crank, said second rigid link, and said tab control arm.

9. In an aircraft, wing means, said wing means having movable slat means connected thereto, said slat means being adapted to be moved in a predetermined path for forming a stall preventing slot in said wing means, aircraft pitch control means connected to the aircraft at a location remote from said wing means and supported independently of said wing means, said aircraft pitch control means being operable to reduce aircraft angles of attack and reducing the stalling tendency of said wing wing means, connecting means connected to said slat means and said aircraft pitch control means in such a manner as to cause said aircraft pitch control means to be moved responsive to any movement of said slat means in said predetermined path, and pilot operable stick control means also connected to said aircraft pitch control means in such a manner as to cause said aircraft pitch control means to be moved responsive to any movement of said pilot operable stick control means.

10. In an aircraft as set forth in claim 9, stop means for limiting the displacement of said pilot operable stick control means in a positive angle of attack direction and permitting said slat means to override said pilot operable stick control means when said slat means are extended in a stall preventing direction.

11. In an aircraft, wing means, said wing means having movable slat means connected thereto, said slat means being adapted to be moved in a predetermined path for forming a stall preventing slot in said wing means, aircraft pitch control means connected to the aircraft at a location remote from said wing means and supported independently of said wing means, said aircraft pitch control means being operable to reduce aircraft angles of attack and reducing the stalling tendency of said wing means, and connecting means connected to said slat means and said aircraft pitch control means in such a manner as to cause said aircraft pitch control means to be moved responsive to any movement of said slat means in said predetermined path.

References Cited in the file of this patent
UNITED STATES PATENTS

| | | |
|---|---|---|
| 2,381,680 | Maxwell | Aug. 7, 1945 |
| 2,428,194 | Bockrath | Sept. 30, 1947 |